Patented Sept. 11, 1934

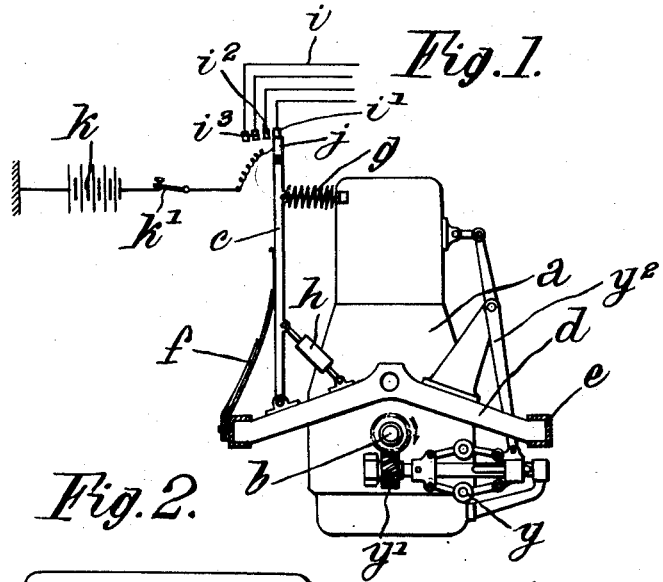
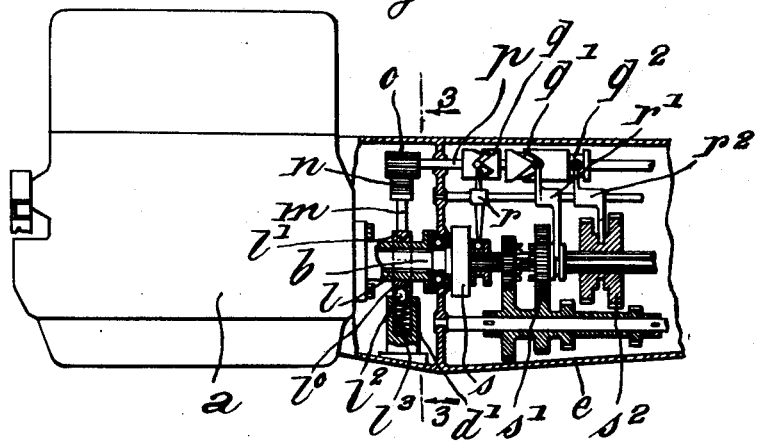

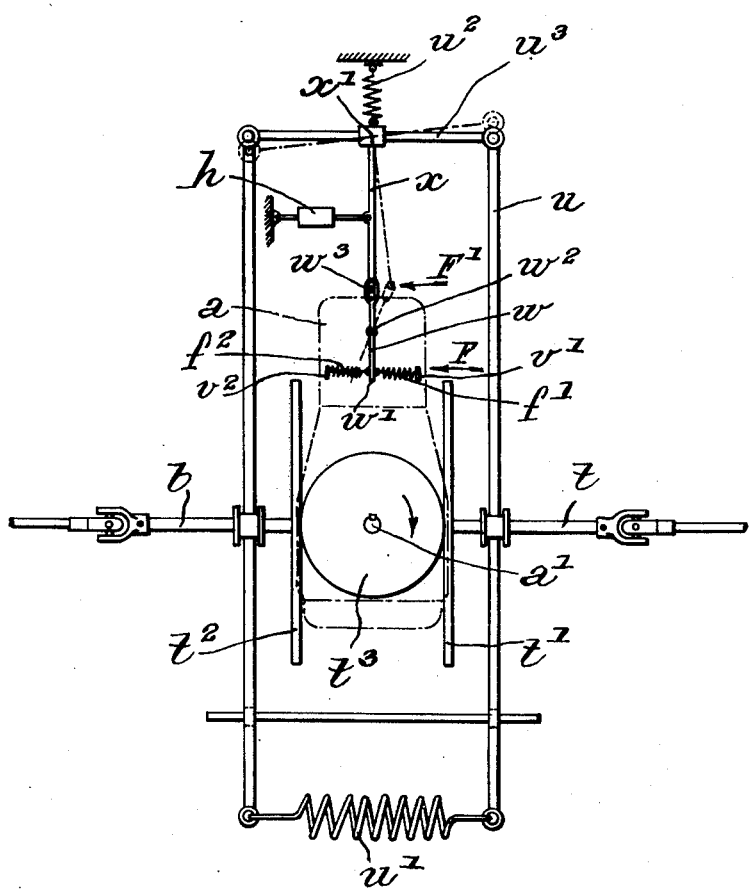

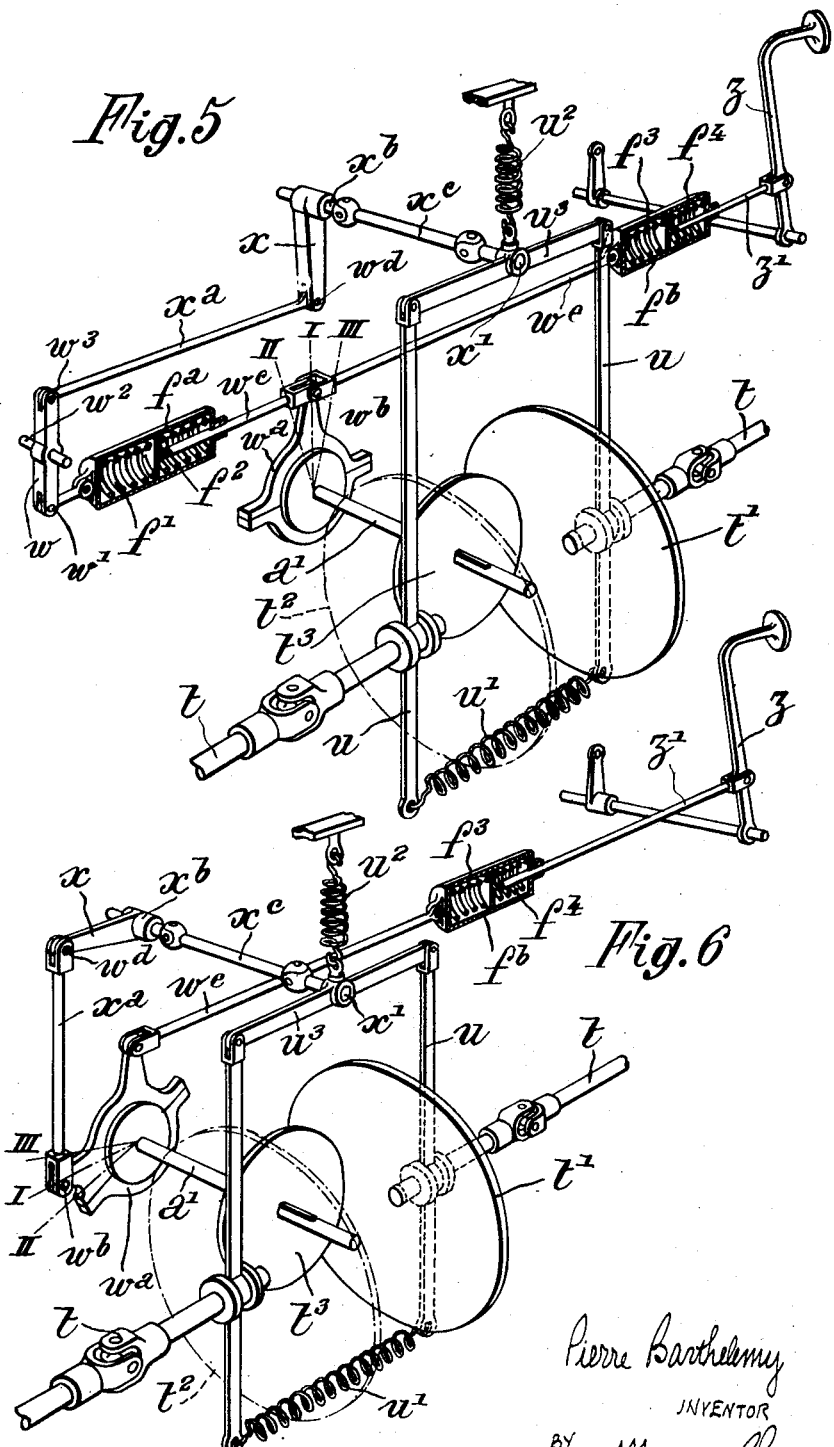

1,973,519

UNITED STATES PATENT OFFICE 1,973,519

CHANGE SPEED MECHANISM

Pierre Barthélemy, Paris, France

Application January 2, 1934, Serial No. 704,955
In Belgium January 11, 1933

16 Claims. (Cl. 180—70)

My invention relates to control devices for variable speed transmissions and more especially for the variable speed transmissions of automobile vehicles.

The object of my invention is to provide a device of that kind which, while permitting to obtain a fully automatic operation of the transmission, is capable of ensuring in a reliable and efficient manner the passage from a certain gear ratio to another gear ratio, either higher or lower.

To this effect, according to my invention, I place the whole of the engine by which the transmission is driven on a flexible or elastic support in such manner that said engine may move with respect to a stationary part under the effect of variations of the driving torque, and I provide means, responsive to the displacements of said engine with respect to said stationary part, for controlling the mechanism through which the gear ratio of the transmission can be changed.

Other features of my invention will appear from the following detailed description of some embodiments thereof.

Preferred embodiments of the present invention will be hereinafter described with reference to the accompanying drawings, given merely by way of example, and in which:

Fig. 1 is a diagrammatic elevational view of a portion of a variable speed transmission provided with a control device according to a first embodiment of the present invention;

Figs. 2 and 3 are diagrammatical views showing in longitudinal section and in cross section respectively a second embodiment of my invention;

Fig. 4 is a diagrammatic elevational view of a part of a variable speed transmission provided with a control device according to a third embodiment of my invention;

Figs. 5 and 6 are diagrammatic perspective views of variations of the embodiment shown in Fig. 4.

According to my invention, supposing the device to be applied to an automobile vehicle, I dispose the engine, which may be of any kind whatever, on the frame of the vehicle, not in a fixed or rigid manner, but, in a known manner, in a flexible or elastic manner. Such an arrangement constitutes a kind of "dynamic balance", permitting the engine to move angularly about a longitudinal axis, which may be for instance the axis of the crankshaft, against the action of elastic means such as one or several springs bearing against the frame of the vehicle. It is known that the angular displacement of the engine unit, with respect to the frame and in the direction opposite to that in which the crankshaft turns, is produced by the reaction of the driving torque and that the amplitude of this displacement varies as a function of said torque.

According to my invention, these variable angular displacements are utilized for the direct or indirect control of the gear box. The latter may be of the progressive type (friction clutches, electromagnetic clutches, or other clutches for the different gear combinations) of the non-progressive type (sliding gears) or even of the types providing for a progressive variation of the gear ratio (including friction discs, conical pulleys, etc.). The displacements of the engine unit with respect to the frame of the vehicle may be transmitted, and eventually transformed and even amplified, for acting directly on the organ through which the gear box is controlled. In ordinary gear boxes with non-automatic control this organ is the one that is actuated by the change speed lever. In automatic or semi-automatic gear boxes, the organ in question is the one that is acted upon by a selecting or release mechanism of any type whatever which is controlled by one or several functional factors (angular velocity or load of the driving shaft, angular velocity of the driven shaft, etc.) of the motor unit.

Instead of acting directly on the control organ of the box, I may actuate this organ through an external energy or a servo-motor (either electric or acting by pressure, suction, etc.) and bring this energy into and out of action through an organ acted upon by the engine unit and which, according to the characteristic positions that it occupies under the effect of relative displacements of said engine unit with respect to the frame, indirectly causes the gear ratios of the change speed box to be changed in the suitable manner in response to variations in the momentaneous power of the engine.

In order to avoid that angular displacements of small amplitude or of insufficient value may produce continual displacements of the organ acted upon by the engine block, I provide the latter with means for immobilizing this organ in any of its characteristic positions as long as the action exerted thereon is relatively small, said means being adapted to allow said organ to pass into another characteristic position when the action exerted thereon reaches a predetermined value, thus permitting the speed to be changed. These means may consist of dash-pots or other stabilizing devices. I may also make use of elastic brakes consisting for instance of a ball or a wedge subjected to the action of a spring of constant or adjustable strength, said ball or wedge being for instance slidably mounted in a stationary support and being adapted to engage into one of several recesses, having inclined walls, provided for instance in a part rigidly connected to the organ that is acted upon by the engine unit.

In the appended drawings, I have shown some embodiments of the control device according to the present invention, as applied to variable speed transmissions chosen of very different types, in order to show the wide range of application of the invention. It should therefore be well understood that the invention is in no way limited to these examples and that it can be adapted, without any difficulty, to the various particular cases that may occur in actual practice.

In the different figures of the appended drawings, it has been assumed that the motor unit $a$ is angularly movable about the main axis of the crankshaft $b$. However, obviously, the axis about which the motor unit pivots could occupy any other desired position. This system is provided with means for elastically opposing the angular movement of the engine unit that takes place under the effect of an increase of the driving torque when the engine is running. The angle through which the engine block turns when it is running with respect to its position when it is not running is substantially proportional, and may even be made, if so desired, exactly proportional, to said driving torque. The system is completed by movable or deformable organs which transmit, transform, or amplify the displacement of the engine unit with respect to the frame of the vehicle in such manner as to make it possible to utilize this displacement for the purpose above described.

In the embodiment of Fig. 1, I make use of a lever $c$ pivoted to a part $d$ rigidly fixed to the frame $e$ and which rests on an elastic organ $f$, consisting for instance of a laminated spring, which organ produces the effort opposing the action of the driving torque. Between this lever $c$ and the engine unit $a$ I advantageously interpose an elastic connection $g$. Finally, I provide between lever $c$ and a fixed point, for instance a point of part $d$, stabilizing means which may consist for instance of a dash-pot $h$. As above explained, these stabilizing means are intended to maintain lever $c$ in a stable position without allowing it to be influenced by the vibrations of the engine unit or by angular displacements of small amplitude. Lever $c$ is therefore capable of occupying several well determined characteristic positions and for each of these positions it can cause, either directly or indirectly, a given gear combination to be brought into action. In the example shown in Fig. 1, it has been supposed that the gear box is of the type including electromagnetic clutches cooperating respectively with the different combinations of gears. Each of these clutches is connected by a wire $i$ with one of the contact studs $i^1$, $i^2$, $i^3$, etc. on each of which the free end $j$ of lever $c$ can come. This end of lever $c$ is suitably insulated and is connected to a source of electricity $k$ through a switch $k^1$. These contact studs $i^1$, $i^2$, etc. are arranged in respective positions such that, when the engine is not running and the engine unit therefore occupies a symmetrical position as to the longitudinal plane of symmetry of the frame, lever $c$ is in contact with contact stud $i^1$ (first gear). It therefore suffices to close main switch $k^1$ for starting the drive in first gear and the gears are automatically changed to higher combinations by the displacement of lever $c$ in front of contact studs $i^2$, $i^3$, etc.

In Figs. 2 and 3 I have shown another embodiment; in this case, I fix, on the engine unit $a$, a sleeve $l$ disposed in coaxial relation to the driving shaft without being in contact therewith. This sleeve $l$ is provided with a radial arm $m$ rigidly fixed thereto and carrying a toothed sector $n$ integral therewith. This sector is always in mesh with a pinion $o$ keyed on a shaft $p$ capable of turning about its own axis and carrying cams $q^1$, $q^2$, etc., which control forks $r^1$, $r^2$, etc. These forks in turn control the sliding gears $s^1$, $s^2$, etc. of a gear box of the conventional type. Shaft $p$ also carries a cam $q$ which, through a sliding arm $r$, acts on a main clutch $s$, which is automatically disengaged when passing from one gear to another and is automatically engaged when shaft $p$ occupies one of its characteristic positions.

According to the angular position of sleeve $l$ and therefore of cam shaft $p$, the automatic changing of the speed is obtained in accordance with the value of the driving torque and, consequently, in accordance with the possibilities of the engine. As elastic means for exerting a reaction effect on the engine unit I may utilize one or several springs, acting at suitable points on the engine unit and bearing against the frame. As for the stabilizing means, they may comprise for instance a piece $l^1$ carried by sleeve $l$ and provided with notches or recesses $l^0$ having inclined walls. A ball $l^2$ subjected to the action of a spring $l^3$ engages into one of these notches and maintains the sleeve in a determined angular position, which corresponds to a certain gear combination of the gear box, until the effort exerted by the driving torque becomes so great that it is necessary to change to another gear combination, the ball then passing into another notch of piece $l^1$ by compressing spring $l^3$. These notches may be made of sufficient size for allowing for a certain play of the ball in one of these notches. Spring $l^3$ may be either of a determined constant strength or its strength may be adjusted from a distance through control means on which the driver acts either directly or through the medium of the throttle pedal in such manner as to modify the values of the speeds of revolution of the engine at which the gear box is caused to pass from one gear into another one.

In the preceding examples it has been assumed, for the sake of simplicity, that the device for automatically controlling the variable speed transmission is subjected only to the action of the variations of the driving torque. However, this functional factor, utilized alone, in combination with one or several springs, is not always sufficient, especially in the case of transmissions for automobile vehicles, for adapting the gear ratio of the transmission to the essentially variable conditions that may occur for the resisting torque. It is therefore necessary, in most cases, to bring into play one or several other factors which depend upon the working of the whole of the engine for completing, or compensating for, the action of the driving torque. Among these functional factors I may cite the speed of revolution of the driving shaft or of the driven shaft, the suction in the intake pipe of the engine, etc., the variable action of these factors being exerted in any suitable manner. For instance, as shown in Fig. 1 this action may be exerted by a centrifugal governor $y$ driven by the driving shaft $b$ through a suitable transmission $y^1$. Such a governor is caused to act, either directly or indirectly, on the control organ $c$ for instance, in the case of Fig. 1. In this embodiment, centrifugal governor $y$ acts, through an amplifying lever $y^2$, on the engine unit in such manner as to oppose the action of the driving torque. In the embodiment of Figs. 2 and 3, the centrifugal governor (not shown in the drawings) would be arranged in such manner as to act on the control organ $l$.

In Fig. 4, I have shown another embodiment in which, besides the driving torque, I cause the resisting torque to intervene for producing, at any time, the gear combination that corresponds to the possibilities of driving by the engine and to the essentially variable conditions under which the vehicle is working. By way of example I have shown a gear box in which the gear ratio varies in a progressive manner. This gear box, which was described in my U. S. application Ser. No. 503,266 of Dec. 18, 1930, comprises two friction discs $t^1$ and $t^2$ disposed in planes parallel to the driving shaft and on either side thereof, said discs are keyed on shafts $t$ connected, through universal coupling means, with the wheels of the vehicle respectively. Between these discs I provide a cylindrical roller $t^3$ capable of sliding on the driving shaft $a^1$ and angularly keyed on said shaft. The shafts $t$ of the discs are carried by the vertical sides of a rectangular frame $u$ the horizontal upper side of which is jointed to these two vertical sides. The lower ends of these vertical sides are pulled toward each other by a spring $u^1$ which ensures an elastic contact of discs $t^1$, $t^2$ with roller $t^3$. This device is characterized by the fact that any variation of the resisting torque produces a vertical displacement of discs $t^1$ and $t^2$ in opposite directions and that this movement has for its effect to cause roller $t^3$ to slide along shaft $a^1$ and consequently to modify the ratio of the speeds of revolution of roller $t^3$ and of discs $t^1$ and $t^2$. When the vertical lateral sides of the frame are moved apart from each other, against the action of spring $u^1$, the transmission is uncoupled. The frame $u$ is freely suspended through a spring $u^2$ carried by a fixed point of the vehicle chassis.

On the chassis of the vehicle, which carries the whole of the mechanism, I provide an axis $w^2$ about which is pivoted a lever $w$ extending on either side of said axis. The upper end $w^3$ of this lever acts, through a sliding connection, on an arm $x$ rigidly fixed to the middle point of the upper side $u^3$ of frame $u$. The lower end $w^1$ of lever $w$ is placed between two springs $f^1$ and $f^2$ the opposite ends of which bear against two abutments $v^1$ and $v^2$ carried by the outer wall of the engine unit, which is pivotally mounted about driving shaft $a^1$. The lengths of the different levers are such that $w^1w^2=w^2w^3$ and that $a^1w^1=w^3x^1$. A dash-pot or the equivalent prevents the vibrations of engine unit $a$ from being transmitted to frame $u$ and to the chassis, while permitting the transmission of slow oscillations resulting from the variations of the torques.

This device works in the following manner: It is assumed that the driving shaft of the engine revolves in the direction of the arrow shown in Fig. 4. During a period of equilibrium, the reaction of the driving torque tends to move the engine unit $a$ in a direction opposite to the direction of revolution of the driving shaft and this causes a slight angular displacement of the engine unit due to which spring $f^1$ is compressed and exerts on the end $w^1$ of lever $w$ a force F directed toward the left hand side of Fig. 4. On the other hand, roller $t^3$ exerts on discs $t^1$ and $t^2$ respective efforts directed in opposite directions which create on cross member $u^3$ a rotational torque the value of which is substantially equal to that of the driving torque, which corresponds to a force $F^1$ passing through point $w^3$, directed toward the left hand side of Fig. 4 and which, due to the equality of the different lever arms, is equal to force F. Lever $w$ is therefore subjected to the action of two forces equal and parallel applied to points of said lever located on either side of its fulcrum and at the same distance therefrom. These forces therefore balance each other and the lever remains in the position shown in solid lines in Fig. 4.

During the period that corresponds to an increase of the driving torque, the angular displacement of the engine unit $a$ increases and also the compression of spring $f^1$ increases. On the contrary, the inertia of the fly-wheel that is keyed on driving shaft $a^1$ prevents the increase of the driving torque from being immediately transmitted to roller $t^3$ and therefore to lever $x$. It results therefrom that forces F and $F^1$ no longer balance each other since F has increased while $F^1$ has not varied. Lever $w$ therefore turns about $w^2$ and comes into the position shown in dotted lines in Fig. 4, thus moving lever $x$ and consequently discs $t^1$ and $t^2$.

This vertical displacement, in opposite directions, of the discs has for its effect, due to the essential characteristic of the variable speed transmission, of modifying the gear ratio in such manner as to increase the load on the engine. As soon as an equilibrium is reached levers $w$ and $x$ come back into their initial positions.

The effect thus produced would be the same if, instead of an increase of the driving torque, there occurred a decrease of the resisting torque. However, there would be a slight difference in the working of the device since, in this case, the inertia of the fly-wheel would act for preventing the variation of the resisting torque from being transmitted immediately to the driving torque. Therefore in this case, force $F^1$ is diminished before force F is diminished in a corresponding manner due to the speed of revolution of the engine increasing. Lever $w$ is acted upon at $w^3$ by a decreasing force and at $w^1$ by the spring $f^1$ the compression of which has not been modified. Therefore this lever turns in the same direction as in the preceding case and thus causes the speed of revolution to increase by maintaining the load of the engine constant.

During the period corresponding to a decrease of the driving torque, the displacement of lever $w$ takes place in the opposite direction. In this case, the reaction due to the driving torque, the tension of spring $f^1$, and consequently force F, decrease. Due to the inertia of the fly-wheel, however, force $F^1$ remains constant, which causes lever $w$ to turn. The angular displacement of cross member $u^3$ and the movement of discs $t^1$ and $t^2$ causes roller $t^3$ to slide along the driving shaft, thus changing the gear ratio and the speed ratio and tending to reduce the load on the engine. A similar effect is obtained when the resisting torque increases.

It is also necessary to consider the case in which the driver desires to utilize the engine for braking the vehicle or the case in which a break down of the engine prevents it from performing its driving function. It will easily be seen that in such cases the direction of forces $F^1$ and $F$ is immediately reversed. In the case of force $F^1$ this is due to the fact that the discs $t^1$ and $t^2$ are urged in the opposite direction by their respective shafts $t$. In the case of force $F$ this is due to the fact that casing $a$ tends to move angularly in the same direction as roller $t^3$. In this case, it is no longer spring $f^1$ but spring $f^2$ that is compressed and the balancing is automatically produced between the torque developed by the wheels of the vehicle and transmitted through shafts $t$ and the torque absorbed by the engine.

In the variations of the above described embodiment that are shown by Figures 5 and 6, I add to the automatic control mechanism a modifying system actuated by the organ which adjusts the power of the engine, and more especially by the throttle pedal $z$.

In the embodiment of Fig. 5, I mount on the engine unit $a$, for instance concentrically with the driving shaft $a^1$, a collar $w^a$ to which is pivoted at $w^b$ a rod $w^c$ the free end of which is subjected to the action of springs $f^1$ and $f^2$ both housed in a casing $f^a$ jointed at $w^1$ to a lever $w$. The other end $w^3$ of this lever is connected through a rod $x^a$ with an arm $x$ keyed on a spindle $x^b$. This spindle is angularly connected through a shaft $x^c$ including universal joints to the middle point $x^1$ of cross member $u^3$. The latter is connected to the vertical sides of the frame $u$ supporting discs $t^1$ and $t^2$, as in the preceding embodiment.

Collar $w^a$ is also connected, through a rod $w^e$, with a casing $f^b$ in which are housed two springs $f^3$ and $f^4$ between which is interposed a plate integral with a rod $z^1$ connected to the pedal throttle $z$. The arrangement is such that $a^1—w^b$ or $a^1—w^1=w^d—x^b$ or $w^3—x^1$ and that $w^1—w^2=w^2—w^3$ as in the embodiment of Fig. 4, so that when the system is in equilibrium, cross member $u^3$ is horizontal, lever $w$ is vertical and springs $f^3$ and $f^4$ are at rest, these springs corresponding respectively to the value of the driving torque and to that of the braking torque that can be produced by the engine. When one or the other of these torques varies there is produced a displacement of collar $w^a$ and therefore of point $w^b$ toward the position II or the position III of Fig. 5 until the whole system comes back to a position of equilibrium.

Once a position of equilibrium is obtained, if pedal $z$ remains stationary, any variation of the resisting torque varies the compression of spring $f^1$ and therefore a displacement of point $w^1$ and an oscillation of cross member $u^3$, which modifies the position of roller $t^3$ until a new equilibrium is obtained bringing back spring $f^1$ to its initial tension. Therefore, for a determined position of pedal $z$ the working of the device is the same as that above described with reference to Fig. 4.

On the contrary, if, once a position of equilibrium has been obtained, pedal $z$ is depressed, the compression of spring $f^3$ is increased; the compression of spring $f^1$ is also increased since by opening the throttle the driving torque has been increased. The equilibrium is therefore destroyed, causing point $w^b$ to move toward position II. Point $w^1$ moves toward the left hand side of Fig. 5 and both lever $w$ and cross member $u^3$ are moved angularly until a new position of equilibrium is obtained which corresponds to a compression of spring $f^3$ equal to zero. Therefore, to every position of the pedal there corresponds a well determined working of the engine to which the position of roller $t^3$ automatically adapts itself. It should be further noted that, to every position of the pedal, there corresponds a state of rest of springs $f^3$ and $f^4$, so that no supplementary effort on pedal $z$ is required.

In the case of a braking action being performed by the engine, springs $f^2$ and $f^4$ play the parts of springs $f^1$ and $f^3$ respectively, as above explained.

In the embodiment shown in Fig. 6, I have simplified the system by dispensing with springs $f^1$ and $f^2$ and also with oscillating lever $w$, the point $w^b$ of collar $w^a$ being directly connected, through rod $x^a$, with the free end $w^d$ of arm $x$. The length of lever arms $a^1—w^b$ and $w^d—x^c$ is calculated in such manner that the tensional effort exerted by $w^b$ on $w^d$ may be, for instance, equal to $\frac{1}{10}$ of the tensional effort exerted by $w^d$ on $w^b$, the difference of $\frac{1}{10}$ being supplied by a compression given to spring $f^3$ by the pedal $z$. In other words said tensional efforts are substantially in balance and the supplementary effort, to obtain an exact equilibrium is supplied by said spring $f^3$.

For any position of equilibrium, cross member $u^3$ is horizontal and collar $w^a$ (and therefore the engine unit) occupies its mean position I.

In the compression of equilibrium, the compression of spring $f^3$ corresponds to $\frac{1}{10}$ of the driving torque and it is due to the displacement of pedal $z$ since case $f^b$, which is connected to collar $w^a$, remains stationary.

Once a position of equilibrium has been reached, if pedal $z$ remains in a determined position, any variation of the driving torque is transmitted, for $\frac{1}{10}$, to spring $f^3$, the compression of which is modified. This causes $w^b$ to move toward position II (or III) and arm $x$ and cross member $u^3$ to move angularly in the corresponding direction until the axial displacement of roller $t^3$ has caused the system to assume a new position of equilibrium, as explained concerning Fig. 4.

Once a position of equilibrium has been obtained, if pedal $z$ is depressed, the driving torque assumes a value equal to 9 times the compression of spring $f^3$ multiplied by the radius of roller $t^3$, which is the lever arm of the driving torque, and said roller $t^3$ comes into the position for which the resisting torque is equal to the driving torque thus determined, so that a new state of equilibrium is obtained.

As in the preceding example, spring $f^4$ is brought into action when it is desired to brake the vehicle by means of the engine.

The different embodiments that have been above described by way of example make it possible to realize that the automatic control device according to the present invention can be applied in a simple and efficient manner to a variable speed transmission of any type whatever. Furthermore, this device might also be applied for varying the angle of incidence of organs such as variable pitch propellers.

While I have described what I deem to be practical and efficient embodiments of my invention, it should be well understood that I do not wish to be limited thereto as there might be changes made in the arrangement, disposition and form of the parts without departing from the principle of my invention as comprehended within the scope of the appended claims.

What I claim is:

1. A system including in combination a frame, an engine carried by said frame so as to be angularly movable with respect thereto about a certain axis, a driving shaft for said engine journalled in said frame, an organ driven by said engine, intermediate means interposed between said driving shaft and said organ for varying the working conditions of said organ, elastic means for tending to maintain said engine in a given angular position with respect to said frame, and means, operative by the angular displacements of said engine that are produced by its torque against the action of said elastic means, for controlling said intermediate means.

2. A system including in combination, a frame, an engine carried by said frame so as to be angularly movable with respect thereto about a certain axis, a driving shaft for said engine journalled in said frame, a driven shaft, a variable speed transmission gear interposed between said driving shaft and said driven shaft, elastic means for tending to maintain said engine in a given angular position with respect to said frame, and means, operative by the angular displacements of said engine that are produced by its torque against the action of said elastic means, for controlling said transmission gear.

3. A system including in combination, a frame, an engine carried by said frame so as to be angularly movable with respect thereto about a certain axis, a driving shaft for said engine journalled in said frame, a driven shaft, a variable speed ratio transmission gear interposed between said driving shaft and said driven shaft, elastic means for tending to maintain said engine in a given angular position with respect to said frame, and means, operative by the angular displacements of said engine produced by its torque against the action of said elastic means, for controlling said transmission gear.

4. A system including in combination, a frame, an engine carried by said frame so as to be angularly movable with respect thereto about a certain axis, a driving shaft for said engine journalled in said frame, a driven shaft, a variable speed ratio transmission system interposed between said driving shaft and said driven shaft, elastic means for tending to maintain said engine in a given angular position with respect to said frame, means, operative by the angular displacements of said engine produced by its torque against the action of said elastic means, for controlling said transmission system, and means, responsive to variations of another functional factor of the engine drive, for controlling said transmission system.

5. A system including in combination, a frame, an engine carried by said frame so as to be angularly movable with respect thereto about a certain axis, a driving shaft for said engine journalled in said frame, a driven shaft, a variable speed ratio transmission gear interposed between said driving shaft and said driven shaft, elastic means for tending to maintain said engine in a given angular position with respect to said frame, means, operative by the angular displacements of said engine produced by its torque against the action of said elastic means, for controlling said transmission gear, and a centrifugal governor actuated by said driven shaft adapted to control said transmission gear.

6. A system including in combination, a frame, an engine carried by said frame so as to be angularly movable with respect thereto about a certain axis, a driving shaft for said engine journalled in said frame, a driven shaft, a variable speed ratio transmission gear interposed between said driving shaft and said driven shaft, elastic means for tending to maintain said engine in a given angular position with respect to said frame, means operative by the angular displacements of said engine produced by its torque against the action of said elastic means, for controlling said transmission gear, and means for preventing the last mentioned means from acting for very small displacements of the engine.

7. A system which comprises in combination, a frame, a driving shaft journalled in said frame, an engine for actuating said shaft angularly movable in said frame about an axis parallel to said shaft, a driven shaft, a friction roller slidably keyed on said driving shaft, a friction disc at right angles to said roller angularly fixed to said driven shaft, elastic means for applying the plane surface of said disc against the circular periphery of said roller, articulated means carried by said frame for movably supporting said disc in tangential relation with said roller, interconnecting means between said engine and said articulated means arranged in such manner that the tendency of said engine to pivot in said frame under the action of its torque and the tendency of said disc to move at right angles to said driving shaft under the action of its frictional engagement with said roller oppose each other, and elastic means interposed in said interconnecting means.

8. A system which comprises in combination, a frame, a driving shaft journalled in said frame, an engine for actuating said shaft angularly movable in said frame, a driven shaft, a friction roller slidably keyed on said driving shaft, a friction disc at right angles to said roller angularly fixed to said driven shaft, elastic means for applying the plane surface of said disc against the circular periphery of said roller, articulated means carried by said frame for movably supporting said disc in tangential relation with said roller, and interconnecting means between said engine and said articulated means including an elastic element arranged in such manner that the tendency of said engine to pivot in said frame under the action of its torque and the tendency of said articulated means to move with respect to said driving shaft under the action of the frictional engagement of said disc with said roller balance each other when the system is working under stable conditions.

9. In a vehicle, the combination of a chassis, a driving shaft journalled in said chassis, an engine for actuating said shaft angularly movable in said chassis, two driven shafts, a friction roller slidably keyed on said driving shaft, two friction discs at right angles to said roller angularly fixed to said driven shafts respectively, elastic means for applying the plane surfaces of said discs against the circular periphery of said roller on either side thereof, an articulated frame carried by said chassis for movably supporting said discs in tangential relation with said roller, said frame including a pivoting cross member, a spring, interconnecting means between said cross member and one end of said spring for tending to move said end of the spring when the cross member is caused to pivot, and interconnecting means between said engine and the other end of said spring for tending to move the last mentioned end of the spring in the opposite direction when the engine is caused to pivot in said chassis, said interconnecting means being so devised that the tendency of said engine to pivot in said chassis under the action of its torque and the tendency of said cross member to pivot in said chassis under the action of the frictional engagement of said discs with said roller balance each other through said spring when the engine is running under stable conditions.

10. A system which comprises in combination, a frame, a driving shaft journalled in said frame, an engine for actuating said shaft angularly movable in said frame, a driven shaft, a friction roller slidably keyed on said driving shaft, a friction disc at right angles to said roller angularly fixed to said driven shaft, elastic means for applying the plane surface of said disc against the circular periphery of said roller, articulated means carried by said frame for movably supporting said disc in tangential relation with said roller, interconnecting means between said engine and said articulated means including an elastic element arranged in such manner that the tendency of said engine to pivot in said frame under the action of its torque and the tendency of said articulated means to move with respect to said driving shaft under the action of the frictional engagement of said disc with said roller balance each other when the system is working under stable conditions, a throttle pedal, and a spring interposed between said pedal and said engine so that said engine tends to pivot about said axis when the throttle pedal is displaced.

11. In a vehicle, the combination of a chassis, a driving shaft journalled in said chassis, an engine for actuating said shaft angularly movable in said chassis, two driven shafts, a friction roller slidably keyed on said driving shaft, two friction discs at right angles to said roller angularly fixed to said driven shafts respectively, elastic means for applying the plane surfaces of said discs against the circular periphery of said roller on either side thereof, an articulated frame carried by said chassis for movably supporting said discs in tangential relation with said roller, said frame including a pivoting cross member, a spring, interconnecting means between said cross member and one end of said spring for tending to move said end of the spring when the cross member is caused to pivot, interconnecting means between said engine and the other end of said spring for tending to move the last mentioned end of the spring in the opposite direction when the engine is caused to pivot in said chassis, said interconnecting means being so devised that the tendency of the engine to pivot in said chassis under the action of its torque and the tendency of said cross member to pivot in said chassis under the action of the frictional engagement of said discs with said roller balance each other through said spring when the engine is running under normal conditions, a throttle pedal, and a spring interposed between said pedal and said engine so that said engine tends to pivot about said axis when the throttle pedal is displaced.

12. A combination according to claim 11 further comprising a spring combined with either of the above mentioned springs and arranged in opposite relation therewith so as to be brought into play when the vehicle is running but the engine does not drive it.

13. A system which comprises in combination, a frame, a driving shaft journalled in said frame, an engine for actuating said shaft angularly movable in said frame, a driven shaft, a friction roller slidably keyed on said driving shaft, a friction disc at right angles to said roller angularly fixed to said driven shaft, elastic means for applying the plane surface of said disc against the circular periphery of said roller, articulated means, carried by said frame for movably supporting said disc in tangential relation with said roller, link means for interconnecting said engine with said articulated means in such manner the tendency of said engine to pivot in said frame under the action of its torque and the tendency of said articulated means to move with respect to said driving shaft under the action of the frictional engagement of said disc with said roller partly balance each other when the system is working under stable conditions, a throttle pedal, and a spring interposed between said pedal and said engine so that it may complete the balancing of the two tendencies above referred to.

14. A combination according to claim 13 further comprising a spring combined with said spring in opposite relation therewith so as to be substituted thereto when the system is working without the engine driving it.

15. A system including in combination, a frame, an engine carried by said frame so as to be angularly movable with respect thereto about a certain axis, a driving shaft for said engine journalled in said frame, a driven shaft, a variable speed ratio transmission gear interposed between said driving shaft and said driven shaft, elastic means for tending to maintain said engine in a given angular position with respect to said frame, means, operative by the angular displacements of said engine by its torque against the action of said elastic means, for controlling said transmission gear, and a centrifugal governor actuated by said driving shaft adapted to control said transmission gear.

16. A system which comprises in combination, a frame, a driving shaft journalled in said frame, an engine for actuating said shaft and angularly movable in said frame, a driven shaft, a friction roller slidably keyed on said driving shaft, a friction disc at right angles to said roller angularly fixed to said driven shaft, elastic means for applying the plane surface of said disc against the circular periphery of said roller, articulated means elastically carried by said frame for movably supporting said disc in tangential relation with said roller, and interconnecting means between said engine and said articulated means including an elastic element arranged in such manner that the tendency of said engine to pivot in said frame under the action of its torque and the tendency of said articulated means to move with respect to said driving shaft under the action of the frictional engagement of said disc with said roller balance each other when the system is working under stable conditions.

PIERRE BARTHÉLEMY.